UNITED STATES PATENT OFFICE.

FRIEDRICH THÖRL, OF HARBURG-ON-THE-ELBE, GERMANY.

PROCESS OF PREPARING STARCH.

990,929.  Specification of Letters Patent.  Patented May 2, 1911.

No Drawing.  Application filed June 12, 1907.  Serial No. 378,495.

*To all whom it may concern:*

Be it known that I, FRIEDRICH THÖRL, a subject of the Emperor of Germany, and resident of Harburg-on-the-Elbe, Germany, have invented a certain new and useful Improvement in Processes of Preparing Starch, of which the following is a specification.

In the heretofore known process of producing sticks of starch the starch paste is desiccated in presses. The damp sticks of starch thus obtained are partly dried for a short period and then either packed in paper and stored up for a long time in a drying chamber, or they are broken up and dried completely at a low temperature. This process always necessitates a very long drying process (4-6 weeks) and large drying chambers, especially if strong and thick sticks are desired.

This invention relates to a new process by which the production of starch in pieces or sticks is very greatly accelerated, so that the bad effect of the long drying operation on the quality of the starch, chiefly caused by fermentation, is avoided.

The process consists in forming into blocks or tablets by pressure the starch powder obtained by rapidly drying the starch until it contains only about 15% of water and afterward grinding the starch, whereupon these blocks or tablets are subjected to the action of a current of warm moist air in special chambers. In this way the tablets or blocks crumble into sticks or pieces according to their thickness, and to the duration of treatment, the pieces being then ready for the market.

The process for producing sticks of starch consists in forming tablets or pieces of starch of a certain weight by pressure, wrapping them up in paper or placing them in cardboard and then subjecting them to the action of warm moist air.

By wrapping up the tablets or blocks in paper or cardboard no repacking of the same in cardboard boxes for sale is necessary after they have been treated, the starch being packed up ready for sale in paper or cardboard of a predetermined weight. For instance the wet starch containing 40 to 45% of water (the amount of water depends on the kind of starch) is taken out of the centrifugal separators or depositing basins and thrown into the vacuum apparatus and dried quickly, one charge—approximately 1500 kg. of wet starch, takes about one hour and a half including filling and emptying. The temperature in the vacuum is about 50° C. The vacuum is kept as high as possible; in practice the vacuum is approximately equal to a 700 mm. column of mercury=0.92% of the total vacuum. The dried starch is passed to the mill by conveyers and elevators, it is then ground and sifted and then immediately pressed in suitable hydraulic presses. The pressed tablets or blocks are wrapped up in paper, placed on trucks in channels and treated with warm moistened air at a temperature of 40-70° C.

The temperature is varied according to the desired thickness and size of the sticks of starch. The tablets etc. soon crumble into sticks or pieces. This operation can be accelerated, that is to say, the action may be intensified by passing steam of ordinary atmospheric pressure into the channels after the treatment with warm moist air.

In consequence of the rapid drying effected with this process the starch is prevented from decomposing, and a product of uniformly high quality is obtained. The pieces or sticks are of a firm nature and may be of any desired thickness. The time saved in manufacture insures considerable saving in wages and space.

Having described my invention what I claim and desire to secure by Letters Patent of the United States is:—

1. A process of preparing starch for the production of pieces or sticks of starch powder consisting in mechanically extracting a part of the moisture then rapidly drying the starch in a vacuum until it contains about 15% of water and then grinding it, forming the dried starch powder resulting therefrom under great pressure, into tablets or blocks, and then subjecting said tablets or blocks to the action of a current of warm moist air, and continuing this action until the tablets crumble into small pieces.

2. A process of preparing starch for the production of pieces or sticks of starch from starch powder consisting in rapidly drying the starch until it contains about 15% of water and then grinding it, forming the dried starch powder resulting therefrom into tablets or blocks at high pressure, wrapping said tablets or blocks in paper or cardboards and then subjecting them to the action of a current of warm moist air for from four to six hours.

In testimony whereof I have signed my name to this specification in the presence of two subscribing witnesses.

FRIEDRICH THÖRL.

Witnesses:
GUSTAV WEBER,
ERNEST H. L. MUMMENHOFF.